Figure 1:
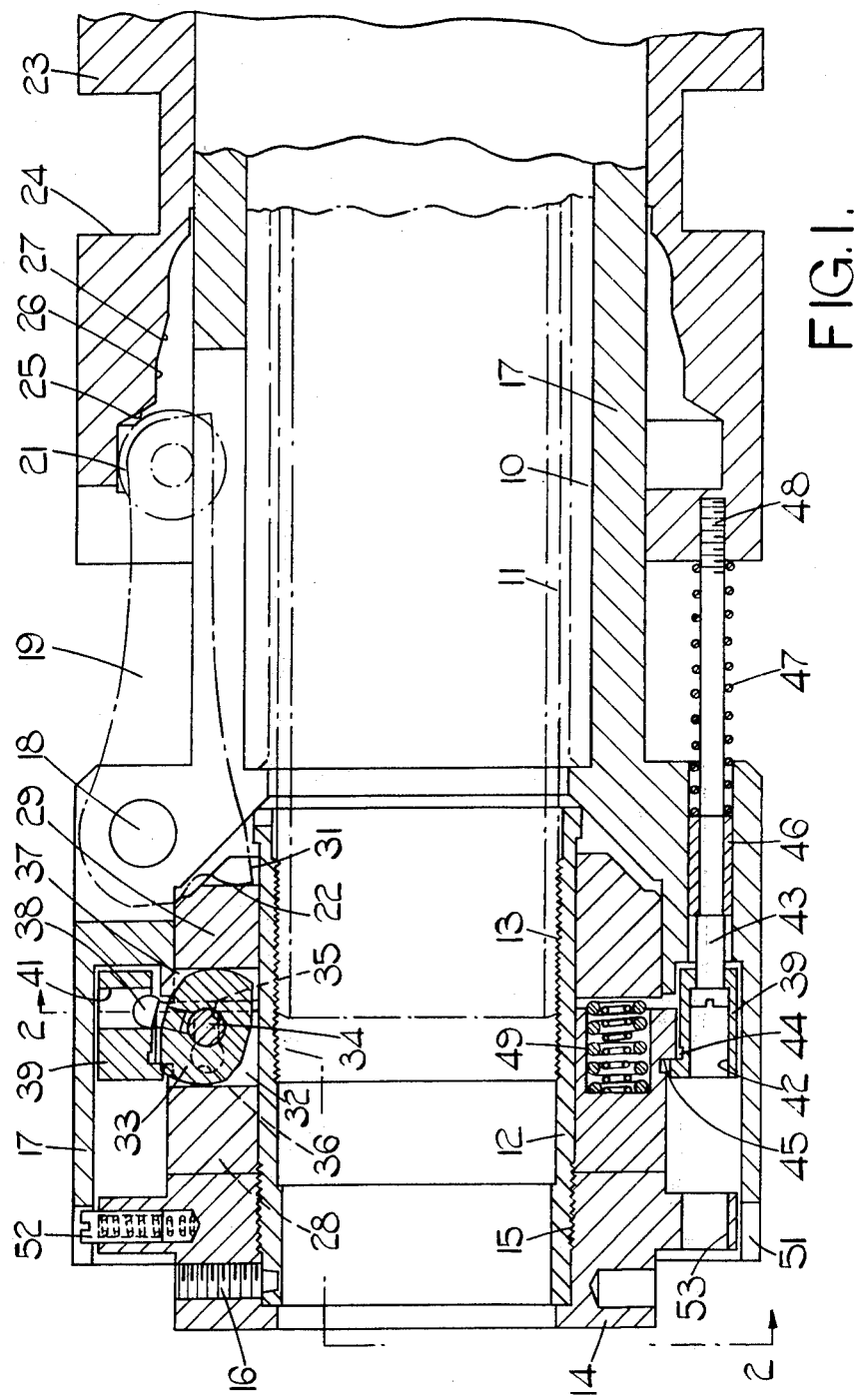

United States Patent [19]
Yearsley

[11] 4,049,282
[45] Sept. 20, 1977

[54] COLLET ACTUATING MECHANISMS

[75] Inventor: Norman Yearsley, Kenilworth, England

[73] Assignee: Wickman Machine Tool Sales Limited, Coventry, England

[21] Appl. No.: 696,541

[22] Filed: June 16, 1976

[30] Foreign Application Priority Data
June 20, 1975 United Kingdom ............... 26276/75

[51] Int. Cl.² .................. B23B 31/20; B23B 31/10
[52] U.S. Cl. .................................................. 279/50
[58] Field of Search .............................. 279/47–51, 279/56–59

[56] References Cited
U.S. PATENT DOCUMENTS

| 628,730 | 7/1899 | Whitney et al. | 279/51 |
| 2,515,183 | 7/1950 | Benjamin et al. | 279/50 X |
| 3,464,710 | 9/1969 | Schultz et al. | 279/51 X |

Primary Examiner—J. M. Meister
Attorney, Agent, or Firm—Andrus, Sceales, Starke & Sawall

[57] ABSTRACT

A collet actuating mechanism for a longitudinally slidable collet tube for a lathe in which toggles are actuated by a slidable sleeve, the toggles acting against a pair of rings separated by a cam which is controlled through a lost motion connection from the actuating sleeve, movement of the cam taking up slack in the mechanism so that the same gripping force is applied to workpieces of varying diameters.

5 Claims, 3 Drawing Figures

COLLET ACTUATING MECHANISMS

This invention relates to mechanical mechanisms for actuating collets on single or multispindle lathes. Collets are provided on the or each of the work spindles of a lathe to grip stock so that successive work pieces may be machined and cut off by tooling provided on the lathe. After machining the collet is relaxed and the stock advanced through the work spindle.

Such a work spindle comprises a hollow work spindle tube with an internal frusto conical surface at its operative end, a collet tube coaxial with and slidably engaged within the work spindle tube, the collet tube having a collet threadably engaged with its end, the collet having a complimentarily frusto conical external surface engageable with the work spindle. The end of the collet is divided into a number of segments so that it can contract inwards to grip a work piece bar or the like, a toggle mechanism being provided to perform axial sliding movement between the work spindle tube and collet tube to allow the workpiece stock to be alternately gripped and released. To actuate the toggle mechanism there is a sleeve slidable around the work spindle tube and causing toggles to act between said slidable tube and an assembly including springs reacting against a nut fixed relatively to the collet tube. Such a collet actuating mechanism will for convenience be referred to herein as being of the kind specified.

Known mechanism of this kind operate satisfactorily if the tolerances of the bar stock are small as in ground or drawn bar. However, with other types of bar such as black bar which is un-machined, the tolerance in the diameter may be as much as 0.060 inches for 1¾ inches diameter bar and pro-rata for other bar sizes. Existing collet mechanisms of the kind specified are not capable of applying satisfactory gripping forces on bar stock of this kind near the opposite extremes of such tolerance. If the stock is on the small side there is a risk that the collet will exert inadequate gripping force on the bar stock thus failing to prevent it moving under machining loads. If on the other hand the bar stock is oversize the collet actuating mechanism will be placed under substantial stress possibly to an extent to cause breakage of one or other of the components of the mechanism.

It is therefore the object of this invention to provide a collet actuating mechanism of the kind specified for a lathe in which the mechanism can be made to accept workpiece stock of wide tolerance with the gripping force being substantially constant.

In accordance with the present invention a collet actuating mechanism of the kind specified comprises spring means acting on one of a pair of axially relatively movable elements which in turn act on the toggle and on the fixed abutment on the collet tube respectively and adjustable cam means also acting between said elements and arranged to alter the effective distance between the toggle and said abutment, the arrangement being such that the collet will grip workpieces of varying diameter with substantially the same gripping force.

Figure 2:
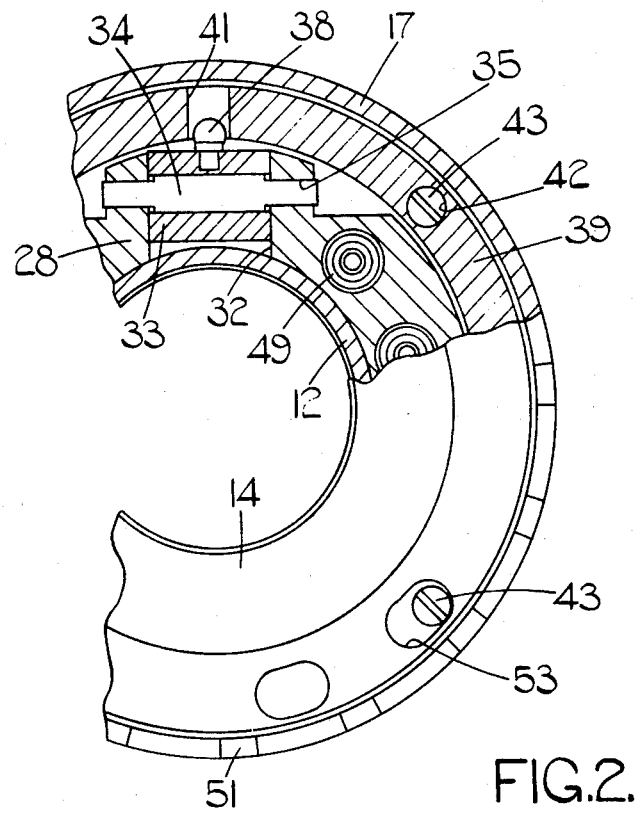
Figure 3:
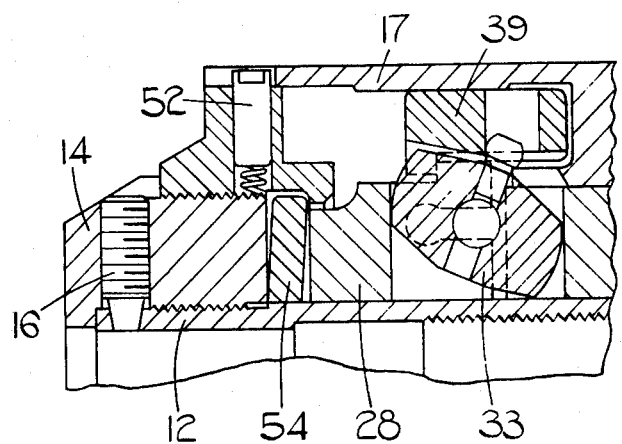

The invention will now be described by way of example with reference to the accompanying drawings in which, FIG. 1 is a cross sectional side elevation view of a collet actuating mechanism constructed in accordance with the invention, and, FIG. 2 is a partial cross sectional view on the line 2—2 in FIG. 1 and FIG. 3 is a fragmentary cross-sectional view of an alternative construction.

The mechanism illustrated forms part of a lathe and is the collet actuating mechanism for a workspindle of which one or more may be provided in the lathe. The collet which is not illustrated is for gripping bar or similar workpiece stock of circular cross section which is fed intermittently from the rear of the machine. The direction of feed of the stock through the mechanism shown in the drawing is to the right in FIG. 1. The workpiece spindle 10 is an elongated sleeve which is mounted in bearings [not illustrated] and having associated means for rotating it in the housing of the lathe. Extending coaxially through and slidable within the workpiece spindle 10 is a collet tube 11. At its front end [not illustrated] the workspindle tube has an internal frusto conical portion. The collet tube 11 has a collet threadably engaged with its end, the collet having a complimentarily frusto conical external surface engageable therewith the end of the frusto conical portion of the workspindle. The outer portion of the collet is slotted lengthwise sc as to permit of expansion and contraction as the two frusto conical surface portions engage and disengage. Slidably mounted in turn within the collet tube 11 is a feed tube [not illustrated] which serves to advance the workpiece stock through the collet incrementally in known fashion.

The collet tube is in two parts haing a rearward extension sleeve 12 engaged on the remainder of the collet tube 11 by means of screw threaded engagement at 13.

Fixed to the rearmost end of this sleeve 12 is a nut 14. This is engaged by means of screw threads at 15 to the sleeve but is also non-rotatably fixed by means of a set screw 16.

Surrounding the workspindle tube 10 is a toggle carrier sleeve 17 enlarged at its rear end, as will be described. The forward end of this toggle carrier sleeve is fixed both axially and rotatably with respect to the workspindle 10 in a manner not illustrated.

Carried on chordal spindles 18 in radial slots in the sleeve 17 are respective toggles 19. Each such toggle is pivoted near one of its ends on a spindle 18 and at its other end carries a rotatable roller 21. At a position offset from a plane passing through the centres of each spindle 18 and of the roller 21, the toggle 19 has an abutment face 22. Pivoting of the toggle 19 results in effective change in the position of such face 22 in a direction substantially lengthwise of the workspindle.

To accomplish pivoting of the toggles 19 there is an actuating sleeve 23 in axial sliding engagement with the toggle carrier sleeve 17. This has intermediate its ends an external rectangular configuration annular groove 24 for engagement by an actuating arm or link [not illustrated] forming part of the associated mechanism of the lathe. The internal surface of the actuating sleeve 23 at the end adjacent the toggles 19 is profiled to provide a series of cam surfaces 25, 26, 27 for engagement by the roller 21 on each of the toggles. Sliding movement of the actuating sleeve 23 to the left as shown in FIG. 1 causes the toggles 19 to pivot in a clockwise direction to an extent determined by the engagement of the roller 21 with said cam surfaces 25, 26, 27 respectively, thus effectively moving said abutment face 22 in a direction lengthwise of the workspindle.

Such a mechanism described thus far is substantially of conventional kind and is arranged to be actuated in accordance with the machining cycle of the lathe to alternately open and close the collet upon the workpiece stock which extends through the interior of the internal feed tube.

However, to transmit movement of the abutment face of the toggles to the collet tube extension sleeve 12 and thus to the remainder of the collet tube 11, there is provided a mechanism capable of compensating for different diameters of bar stock. This mechanism comprises first and second rings 28, 29. The ring 28 abuts against the nut 14 while the ring 29 abuts against the surface 22 of each of the toggles 19. The ring 29 is slotted in its end presented towards the toggle 19, to provide respective recesses 31 to receive those portions of the toggles on which the surface 22 are formed respectively.

The ring 28 is provided with two diametrically opposite radial slots 32 extending from one end of the ring. Each such slot is occupied by a shaped cam 33 pivotally mounted on a spindle 34. The ends of the spindle are flattened and are engaged on respective open ended chordal slots 35. Each such slot 35 terminates in a part-circular enlargement at 36. The arrangement is such that the cam 33 can rotate on the spindle 34 but the spindle itself can move axially through its two slots 35 while being prevented from rotating relatively to the ring 28 by the flattened ends of the spindle.

The cam 33 also extends into radial slots 37 in the adjacent end of the ring 29.

The cam 33 has a short ball-ended lever 38 extending out of it in a direction generally radially outwardly wih respect to the common axis of the work and collet tubes. Rocking of the lever 38 accomplishes angular movement of the cam 33, which has surfaces arranged to engage the bases of the respective recesses 32 and 37 in the rings 28 and 29 respectively, thus adjusting the distance between the rings 28 and 29.

Partially surrounding the rings 28, 29 are two spaced segmental elements 39. One of these is shown in FIG. 2 whereas both are shown in FIG. 1, through the second cam 33 and associated mechanism is not shown in the lower half of FIG. 1.

The segmental elements 39 occupy the space defined between external surfaces of the ring 28 and the internal surface of the toggle carrier sleeve 17 at its enlarged end. The segmental elements 39 have respectively radial bores 41 into which the levers 38 extend. In addition there are stepped axial bores 42. The bores 42 receive the headed ends of respective screws 43. The internal surface of each segmental element 39 is stepped to provide a shoulder 44 arranged to abut against a corresponding axially presented shoulder 45 formed on the exterior surface of the ring 28.

The screws 43 are stepped to provide an abutment for one end of the sleeve 46, serving itself as an abutment for one end of a compression spring 47 surrounding the bolt 43. The extremity of the bolt is screw threaded and engages, at 48, in a threaded bore in the actuating sleeve 23. The other end of the spring 47 also abuts against the actuating sleeve 23.

Acting between the rings 28 and 29 are heavy compression springs 49 occupying pockets in the ring 28.

The portion of the toggle carrier sleeve 17 which surrounds the segmental elements 39 terminates in a portion having a series of slots 51. Engaging in one of the slots is a captive radially outwardly spring loaded pin 52 carried in the nut 14. This provides an axially adjustable non-rotatable connection between the toggle carrier sleeve 17 and the nut 14 and thence the collet tube 11.

The nut 14 has a number of oval openings 53 which provide access to the screws 43.

Operation of the mechanism is as follows. In FIG. 1 the toggle 19 illustrated is in a position corresponding with the collet open condition, wherein the stock can pass freely through it. When the operating cycle of the lathe calls for locking of the collet, the following sequence takes place. The actuating sleeve 23 is moved to the left in FIG. 1 until the toggle roller 21 co-acts with the portion 25 of the cam surface. This rotates the toggle 19, thus driving the ring 29 to the left that is towards the ring 28. Because the screws 43 are fixed in the actuating sleeve 23, the heads of these screws move back in the bores 42 formed in the segmental elements 39. These elements are now therefore free to move under the action of the springs 49 acting between the rings 28 and 29. This action causes the collet to close to an initial position. Continued movement of sleeve 23 causes interengagement between the sleeve 46 and the rear face of the segmental elements to cause further movement of the segmental elements 39 to the left when the toggle roller 21 reaches portion 26 of the profile. Such movement, furthermore, of the segmental elements 39, causes rotation of the cams 33 through their levers 38, thus taking up any slackness between the rings 28 and 29. This movement thus permits compensation to the variation in size of the bar stock.

Continued movement of the actuating sleeve 23 brings the roller 21 on each of the toggles 19 onto the surface 27 so that the final movement of the toggles is transmitted in the form of a locking force applied to the collet to provide final gripping on the workpiece stock. This arrangement provides substantially constant gripping force in the collet for any diameter of the workpiece stock within the range determined by the cams 33.

To release the collet, the actuating sleeve 23 is moved to the right and the opposite sequence takes place. The fully open position of the collet corresponds with maximum outward position of the toggles 19 as illustrated and furthermore the segmental elements 39 are moved as far as possible to the right, thus minimising the distance between the rings 28 and 29. This movement is caused by engagement of shoulders 44 and 45 as the bolts 43 move to the right with the sleeve 23. This causes springs 49 to be compressed to allow the collet to open.

If more compensation for variation in bar size is required that can be conveniently be provided by the cams 33, a heavy section disc spring 54 may be incorporated between the ring 28 and nut 14. This modification is illustrated in FIG. 3.

I claim:

1. A collet actuating mechanism comprising a hollow work spindle tube with an internal frusto conical surface at an operative end thereof, a collet tube co-axial with and slidably engaged within the work spindle tube, the collet tube having a collet threadably engaged with its end, the collet having a complimentarily frusto conical external surface engagable with the work spindle, the end of the collet being divided into a number of segments to that it can contract inwards to grip a work piece, a toggle mechanism to perform axial sliding movement between the work spindle tube and collet tube, a sleeve slidable around the work spindle tube to cause the toggles to act between the slidable tube and an assembly including springs reacting against a nut fixed relatively to the collet tube, spring means acting on one of a pair of axially relatively movable elements which, in turn, act on the toggle and on the fixed abutment on the collet tube, respectively, and adjustable cam means also acting between said elements and arranged to alter the effective between the toggle and said abutment, the arrangement being such that the collet will grip work pieces of varying diameter with substantially the same gripping force.

2. A collet actuating mechanism according to claim 1 in which the pair of elements comprise respective rings between which the adjustable cam means is engaged, the spring means also acting between said elements.

3. A collet actuating mechanism according to claim 1 in which the cam means is connected to the sleeve whereby the toggle is actuated, the connection between them incorporating lost motion means to accommodate different axial movement between the pair of elements to allow the collet to grip work pieces of varying diameter.

4. A collet actuating mechanism according to claim 1 in which additional spring means is disposed between one of the elements and the abutment to tend to separate them.

5. A collet actuating mechanism according to claim 1 in which one of the pair of elements acts against said abutment and its position is axially adjustable.

* * * * *